Nov. 2, 1965  G. JOFFE  3,215,344
FERTILITY CALCULATOR
Filed July 24, 1964  3 Sheets-Sheet 1

INVENTOR.
GERARDO JOFFE
BY Stanley Bialos
ATTORNEY

Nov. 2, 1965 G. JOFFE 3,215,344
FERTILITY CALCULATOR
Filed July 24, 1964 3 Sheets-Sheet 2

INVENTOR.
GERARDO JOFFE
BY Stanley Bialos
ATTORNEY

Nov. 2, 1965                G. JOFFE                3,215,344
                       FERTILITY CALCULATOR
Filed July 24, 1964                              3 Sheets-Sheet 3

INVENTOR.
GERARDO JOFFE
BY Stanley Bialos
ATTORNEY

United States Patent Office 3,215,344
Patented Nov. 2, 1965

3,215,344
FERTILITY CALCULATOR
Gerardo Joffe, 465 California St., San Francisco, Calif.
Filed July 24, 1964, Ser. No. 384,852
5 Claims. (Cl. 235—78)

This invention relates to a calculator and, more particularly, to a device for determining the starting date and number of fertile days of a woman in each of her menstrual cycles.

It is well accepted that the ovulation of a woman is related to the start of the menstruation period following each such ovulation. More particularly, in every menstrual cycle of a woman (i.e., the time between the start of one menstruation period and the next), every woman ordinarily has one ovulation and the time of that ovulation is related to the start of her next menstruation. This ovulation is accepted as taking place fifteen days before the start of the next menstruation.

It is also known that after ovulation, the ovum (egg) has a life during which it can be fertilized of just about one day. In addition, the male sperm has a maximum life span of about two days. Therefore, the conception period of a women, i,e., the time during which she can become impregnated, is three days long—the two days preceding ovulation and the one day following ovulation.

From the above, it can be seen that if the date of the next menstruation period of each individual woman is known, the days during each menstrual cycle in which she can become impregnated so that she can conceive, can be calculated. However, most women are not "regular," i.e., the lengths of their menstrual cycles vary. Unless this variance in the length of menstrual cycles is properly taken into account, any calculation with respect to the time of the woman's conception period is subject to grave error. The mathematics involved in taking this variance into account, however, confuses many women and, therefore, mistakes are made. In addition, the application of the above principles to the calender month can also be very confusing.

For many women, an accurate determination of the conception period is of decisive importance for the protection of their health. In other women, a determination of the conception period is advantageous for economic, psychological and other reasons. Thus, it can be seen that it is desirable to have a simple and ready means for predicting the conception period of a woman with accuracy and safety.

While tables and calculating devices have been devised in the past for the determination of the conception period of a woman, these quite often do not properly take into account the variance in the lengths of the woman's menstruation cycles. Those that do take into account such variance are generally complicated, especially in their application of this variance to the calendar month.

The present invention is embodied in a simple, safe, and easy to use device for calculating the conception period of a woman. Summarizing the same, the device comprises a disc member having a first arcuate set of numerals or indicia for designating the length in days of the woman's shortest menstrual cycle as determined by her from records kept over a previous preselected period of time, desirably at least a year, and a second disc member concentric with the first and having a second set of numerals or indicia for designating the date of the start of her last menstruation period as determined from her records. One of these discs is rotatable with respect to the other in order to selectively correlate the numerals of one of the above numeral sets with the numerals of the other. A third set of numerals or indicia on one of the two disc members provides the starting date of the "fertile days," i.e., the days of the conception period plus a period of safety days which takes into account the variance, of the woman corresponding to each correlation of numerals from the first and second sets of numerals.

The invention desirably has a third disc member concentric with the first two with a fourth set of numerals or indicia for designating the variance in days of the woman's longest and shortest menstrual cycles as determined from the records kept during the aforementioned preselected period of time, and a fifth set of numerals or indicia, each numeral of which has a predetermined relationship to a numeral of the fourth set to provide the number of fertile days.

The present invention determines the date of the start of the fertile days independently of the variance between the woman's longest cycle and shortest cycle. Thus, this determination is accomplished by the present invention simply and with a minimum of manipulative steps and moving parts. However, this variance is properly taken into account by the present invention in determining the number of fertile days and, therefore, a completely reliable determination of the woman's fertile days is assured. In addition, the present invention determines the number of fertile days independently of the start of the last menstration period. Therefore, this determination is also easily accomplished by the present invention with a minimum number of steps. Further, the number of fertile days calculated by the present invention includes extra days for added safety. Due to the arrangement and structure of the disc members, the present invention is easily manipulated and the desired information readily obtained.

From the above, it can be seen that the present invention has as its objects, among others, the provision of an improved simple, easy to use calculator for determining the fertile days of a woman; the provision of such a calculator that takes into account the variance in length of the menstrual cycles of a woman, and takes such variance into account in the most efficient manner; and the provision of such a calculator that because of its structural arrangement can be used easily and without confusion. Other objects of the invention will become apparent from the following more detailed description taken with reference to the attached drawings in which:

Figure 1:
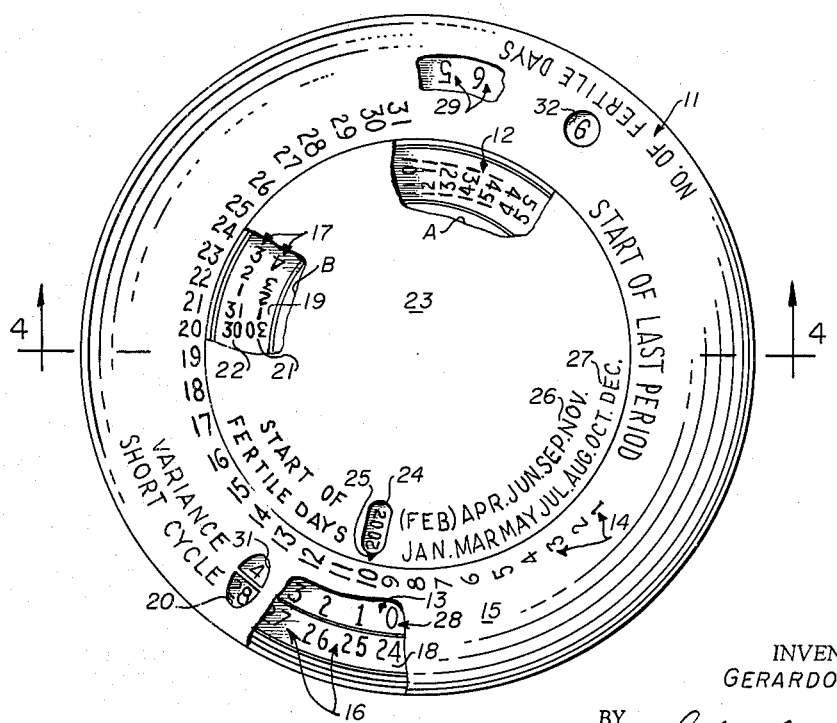
FIGURE 1 is a plan view of the calculator device of this invention with portions of the structure broken away, to illustrate the construction more clearly.
Figure 2:
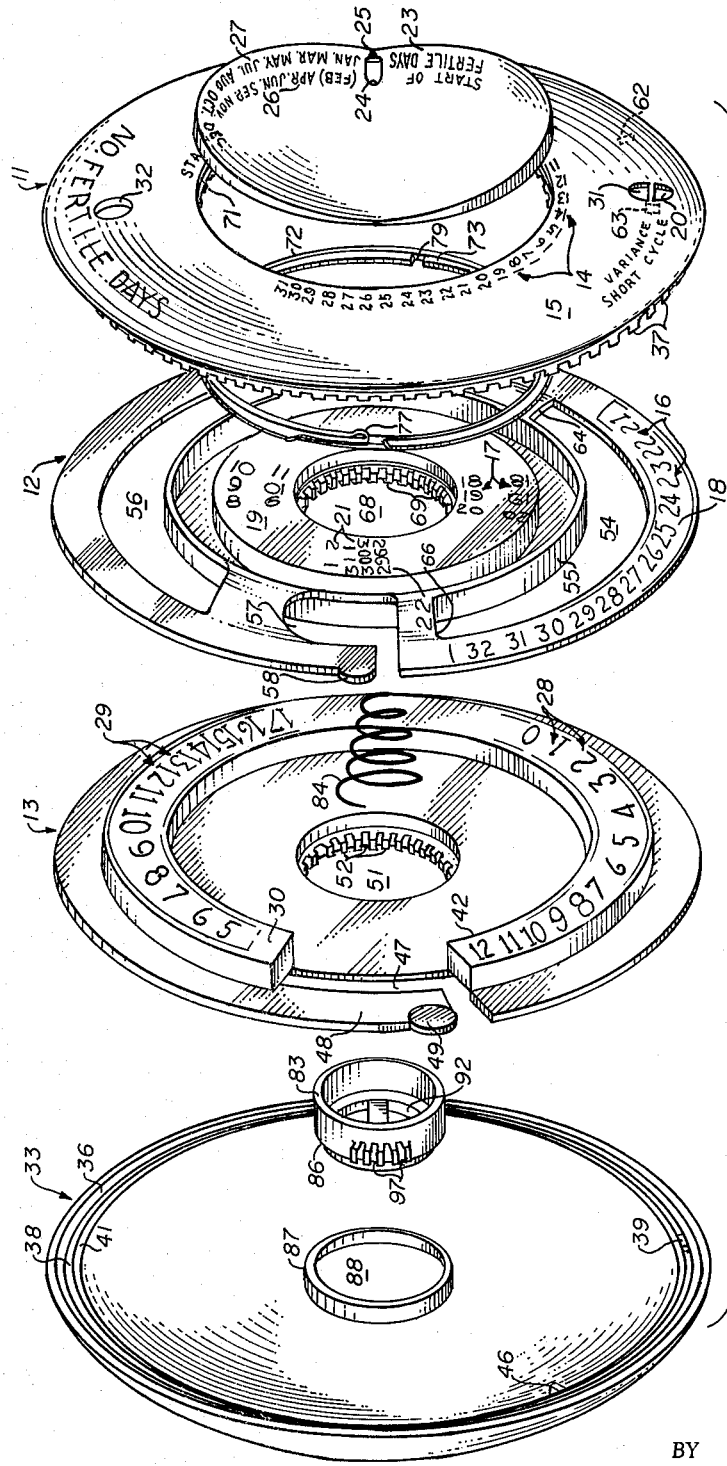
FIGURE 2 is an exploded isometric view of the calculator showing the upper sides of the parts thereof.

With reference to FIGURES 1 and 2, the calculator hereof has three concentric discs 11, 12 and 13. Disc 11, which overlies discs 12 and 13 is annular and has a first arcuate set 14 of numerals 1 through 31 about the inner periphery of its face 15 for designating the date of the month on which a woman's last menstrual cycle started. Disc 12 can be rotated with respect to disc 11 and has arcuate second and third sets 16 and 17 of numerals on outer and inner annular portions 18 and 19, respectively, of a face thereof. Numeral set 16 has the numbers 21 through 32 and is for designating the length in days of the shortest menstrual cycle of a woman over a previous preselected period of time, which is desirably as long as a year. This numeral set 16 is overlaid by an opening or window 20 in disc 11 through which selected numbers of set 16 may be observed. Numeral set 17 is positioned on disc 12 adjacent the inner perpihery of disc 11 and, hence, adjacent numeral set 14. This numeral set 17 has two arcuate rows of numbers 21 and 22 for designating the days of the months having thirty and thirty-one days, respectively. It is from numeral set 17 that the starting date of the fertile days of a woman can be read.

As shown at the broken away portion A of FIGURE 1, both number rows 21 and 22 start with the number 4 and proceed to the numbers 30 and 31, respectively, shown in broken away portion B. From there, both rows 21 and 22 proceed with the days in the following month up to the 15th and 14th, respectively, as shown in broken away portion A. These rows include all of the monthly days on which the fertile days can start if the shortest menstrual cycle is between 21 and 32 days long.

The relationship of numeral set 14 and numeral sets 16 and 17 is such to solve the following simple equation.

(1) $$B = M + (S - 18)$$

where
B represents the beginning or in other words starting date of a woman's fertile days;
M represents the date of the start of the woman's last menstrual cycle; and
S represents the number of days in a woman's shortest menstrual cycle in a previously preselected period of time.

This equation is based on those known principles discussed earlier. The starting date (M) of the last menstruation appears in the equation to give a starting date from which to do the calculating. The length of the short cycle (S) is added to (M) in order to provide the safest presumption of the start of the next menstruation period. By utilizing the shortest cycle in the equation rather than the longest cycle, the variance is eliminated as a factor in the calculations.

The number eighteen is subtracted because of the aforesaid known principles that ovulation takes place fifteen days before the succeeding menstruation commences, and male sperm can have a life span of two days. As a safety factor, another day is added to provide the total of eighteen days. Thus, the equation provides a date eighteen days less than the sum of the date of the start of the woman's last menstrual cycle and the length in days of the woman's shortest cycle over a previous preselected period of time.

Because the variance does not directly appear in the above equation, it is relatively simple, which makes for simplicity in the calculation of the starting date (B) of the woman's fertile days. Disc 12 need only be rotated to display the length of the short cycle (S) in window 20 and the numbers of rows 21 and 22 becomes radially aligned with the numbers of set 14 to provide a starting date (B) of the fertile days for every one of the starting dates (M) of the last menstruation.

To assure that no mistake can be made in viewing the starting date (B) of the fertile days, a rotatable selector or plate 23 covers numeral set 17 and has a window 24 to display selected numbers from the set. It is turnable with respect to disc 11 such that an indicator mark 25 fixed on the selector, can be selectively moved to designate a number from numeral set 14. Thus, to determine the starting date (B) of the fertile days, disc 12 is rotated to display the length of the short cycle (S) in window 20, and selector 23 is turned so that indicator mark 25 designates the start of the last menstruation period (M). Then the start of the fertile days (B) appears in window 24.

For example, if the shortest cycle was twenty-eight days as displayed in window 20 in FIGURE 1 and the start of the last period was on the tenth of the month as indicated by mark 25 in FIGURE 1, the starting date of the fertile days in months having both thirty and thirty-one days would be on the twentieth of the present month as shown in window 24. If indicator mark 25 is moved to a position opposite "23" designating the start of the last period on the twenty-third of the month (see broken away portion B of FIGURE 1), the starting date of the next fertile days appearing in window 24 would be on the third of the following month if the present month has thirty days, but on the second of the following month if the present month as thirty-one days. Note that selector 23 is stamped with two arcuate rows 26 and 27 of months, denoting the months with thirty and thirty-one days, respectively. These rows 26 and 27 overlie directly the rows 21 and 22, respectively, and indicate the month in which the last menstruation started, thereby facilitating proper determination of which number row provides the starting date of the fertile days. The month February, which ordinarily has twenty-eight days, is included in row 26. However, it is bracketed in order to remind the user to add two days should the starting date of the fertile days fall in the next month.

Disc 13 has fourth and fifth numeral sets or scales 28 and 29, respectively, on its face 30. Windows 31 and 32 in disc 11 overlie numeral sets 28 and 29, respectively; and disc 13 is rotatable with respect to disc 11 to selectively display numerals from set 28 in window 31. This set 28 has the numbers 0 through 12 for designating the variance in days of the woman's longest and shortest menstrual cycles during a previous preselected period of time, desirably at least a year; and set 29 has the numbers 5 through 17 for designating the number of fertile days. Each number of set 29 has a predetermined relationship to a number of set 28, such that when a number of set 28 is displayed in window 31, a number of set 29 appears in window 32 to solve the following equation:

(2) $$F = V + 5$$

where
F represents the number of fertile days; and
V represents the variance in days of the woman's longest and shortest menstrual cycles during a preselected period of time.

The number "5" in this equation is derived from the length of a woman's conception period. As discussed earlier, a woman can only be impregnated on three days in each cycle, namely, the two days before ovulation and the day after ovulation. For safety, two days are added, one for the beginning of these three days and one for the end; thus the total five.

The "variance" is added to the number "5" of Equation 2 in order to assure that if the present cycle is not the woman's shortest cycle (on which the first mentioned Equation 1 is based), the number of "fertile days" calculated is sufficiently long to include the five days discussed supra. It should be noted that the term "fertile days" as used herein does not just refer to the three days in which a woman can be fertilized and the two aforementioned safety days, but also the length in days of the variance of the woman's longest and shortest menstruation cycles over a preselected period of time.

The number of fertile days automatically appears in window 32 when the "variance" number is displayed in window 31 because each number in set 29 is five greater than a number in set 28 which is 180° or diametrically opposite such number in set 29; and window 32 is diametrically opposite window 31. Therefore, when any given number from set 28 is displayed in window 31, a number in set 29 which is five days greater appears in window 32.

As can be seen from the above equation, the number of fertile days is determined independently of the starting date of the woman's last menstruation period. Therefore, its determination can be easily accomplished with a minimum number of movable parts and with minimum manipulation of the device.

The preselected period of time over which the woman should keep records on the length of her menstrual cycle should be long enough to be representative of the length of her cycles, desirably at least a year as previously mentioned.

Figure 4:
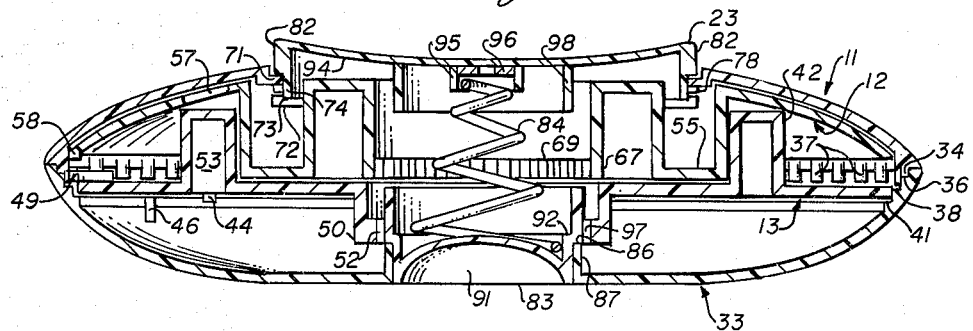
FIGURE 4 is a cross-sectional view taken in a plane along line 4—4 of FIGURE 1.
Figure 3:
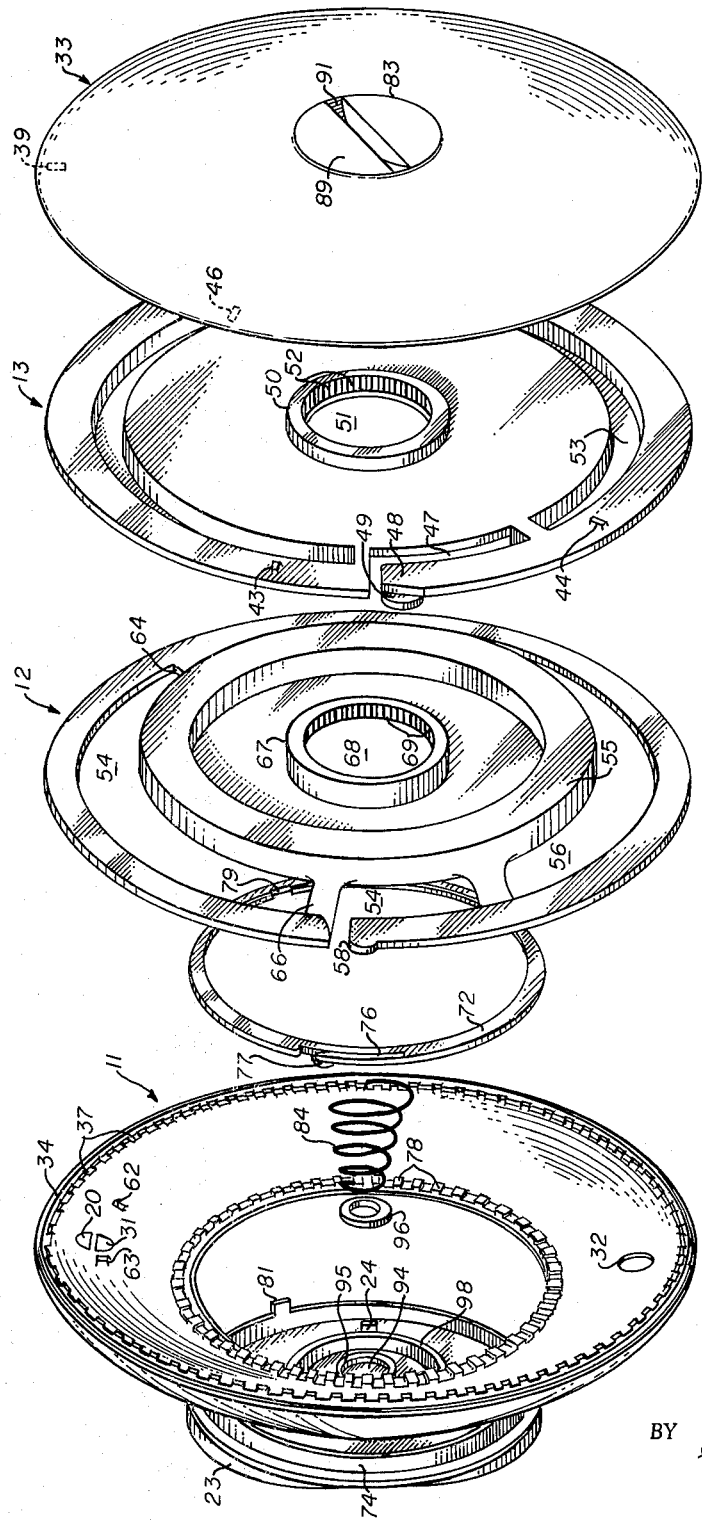
FIGURE 3 is an exploded isometric view of the calculator showing the under sides of the parts thereof.

For a more detailed description of the construction of the present invention, reference is made particularly to FIGURES 2 through 4. Disc 11 is saucer-shaped and is adapted to mate with a bottom saucer 33 to form a convex discoidal body to enclose discs 12 and 13. An annular ridge 34 on disc 11 rests on shoulder 36 on saucer 33 and is fixedly secured thereto, desirably by a suitable adhesive such as an epoxy resin. Disc 11 has a set of cog teeth 37 on the inner periphery of ridge 34, for a purpose explained later. Teeth 37 extend beyond ridge 34 to a shoulder 38 of saucer 33.

To assure the proper positioning of the windows 31 and 32 of disc 11, and of rotation stops to be noted later, a centering nub 39 is provided on saucer 33. Window 31 is radially aligned with and adjacent to nub 39 which is of a size just to fit between two of cog teeth 37 to assure proper positioning.

Disc 13 rests on shoulder 41 of saucer 33 and has an annular ridge 42 with numeral sets 28 and 29 thereon. When assembling the calculator hereof, disc 13 is positioned within saucer 33 such that centering nub 39 is adjacent numeral set 28. Two stops 43 and 44 on the bottom of disc 13 coact with stop 46 on saucer 33 to limit the extent of rotation of disc 13 with respect to saucer 33 and disc 11 such that it can only be rotated sufficiently to display selectively each of the numbers of set 28 in window 31 and, thereby, the numbers of set 29 in window 32.

A slot 47 is provided in disc 13 with the disc being open at one edge of the slot to provide a spring finger 48. A raised nub 49 on the end of finger 48 engages the cog teeth 37 and coacts therewith whenever disc 13 is rotated. Teeth 37 are so spaced and nub 39 so positioned that whenever a number from set 28 appears in window 31 or a number from set 29 appears in window 32, the nub is between two of the teeth 37. Thus, the disc is positively set when numbers appear in windows 31 and 32 with the numbers being centered in the windows.

A ridge 50 projects from the underside of disc 13 and surrounds a center hole 51 through the disc. Teeth 52 are provided on the inner periphery of ridge 50 in order that the disc can be rotated as will be explained hereinafter. Also, disc 13 has an annular groove 53 on the under side thereof coinciding with ridge 42 in order to save weight and material.

Disc 12 is adapted to rest on disc 13 with an annular ridge 55 on its under side fitting within the inner periphery of ridge 42. Arcuate slots 54, 56 and 57 are provided about the periphery of disc 12 adjacent ridge 55. Slots 54 and 56 are positioned and are of a size to overlie the numeral sets 28 and 29, respectively, on disc 13 so that numbers from these sets will be able to appear therethrough in windows 31 and 32. Numeral set 16 is positioned on the face of annular portion 18 of disc 12 adjacent the outer periphery of slot 54; and selected numbers from it can appear in window 20. Numeral set 17 is on the face of annular portion 19 which is positioned to be adjacent the inner periphery of disc 11. Disc 12 is open adjacent slot 57 similarly to the arrangement of slot 47 on disc 13, and is also provided with a nub 58 to coact with teeth 37. Nub 58 is so positioned that it is between two teeth 37 whenever a numeral from set 16 appears in window 20 and numerals from set 17 appear in window 24.

The under surface of disc 11 is provided with two stops 62 and 63. These stops 62 and 63 coact with edges 64 and 66, respectively, of slot 54 to limit the rotation of disc 12 with respect to disc 11, so that it can only be rotated sufficiently to display selectively each of the numbers of set 17 in window 18. Disc 12 has a shoulder 67 extending from its under side to define a center hole 68 with teeth 69 about its lower periphery similar to center hole 51 in disc 13.

Selector 23 is rotatably held in position on an annular shoulder 71 on the inner periphery of disc 11 by a retaining ring 72. This retaining ring has an annular shoulder 73 which mates with flange 74 on selector 23 and is suitably secured thereto desirably by an adhesive. When so assembled, retaining ring 72 overlaps the inner periphery of disc 11 and holds selector 23 rotatably on the disc.

A portion 76 of ring 72 is split from the remainder to provide a spring loading to a nub 77 which engages and coacts with cog teeth 78 on the underside of disc 11 near its inner periphery. A recess 79 in ring 72 mates with a tab 81 on selector 23 to assure proper positioning of nub 77 with respect to selector 23 so that nub 77 is between two of teeth 78 whenever mark 25 indicates a number in set 14 and window 24 overlies a number of row 21 and a number of row 22.

The top surface of selector 23 is shaped concavely, and opposite portions 82 of its periphery project beyond disc 11 for easy gripping and rotation of the selector.

The mechanism for selectively rotating discs 12 and 13 with respect to fixed disc 11 comprises a movable clutch in the form of a selective driver 83, and a conical coil spring 84. Driver 83 has a shoulder 86 which rides on an annular ridge 87 about center hole 88 in saucer 33. Ridge 87 is of such a height that the surface of the under side 89 of driver 83 is flush with the under surface of saucer 33. A slot 91 having an arcuate bottom adapted to receive the edge of a coin is provided on the under side 89 of driver 83. The base end of spring 84 rests within the inner periphery of a shoulder 92 in driver 83 while its upper end engages the under side 94 of selector 23 within annular ridge 95. Such spring is under compression when disc 11 and saucer 33 are mated, thereby resiliently pressing driver 83 against annular ridge 87. A metal washer 96 is glued or otherwise suitably secured within ridge 95 to provide a hard, smooth riding surface for the narrow end of spring 84 to facilitate rotation of selector 23.

When driver 83 is against shoulder 86 of saucer 33, teeth 97 about its periphery engage between teeth 52 of disc 13. Thus, whenever driver 83 is rotated by a coin, it rotates disc 13 to selectively display numbers from sets 28 and 29 in windows 31 and 32, respectively. By pushing selective driver 83 against spring 84 from its position on ridge 87, teeth 97 disengage from teeth 52 and engage between teeth 69 of disc 12. This is also accomplished with a coin within slot 91. As the driver is pushed upward, it receives an annular guide 98 on selector 23 adapted to fit relatively snugly therein to assure that teeth 97 properly engage between teeth 69. Rotation of the coin then rotates disc 12 to selectively display numbers from set 16 in window 20.

As shown, appropriate legends identify each of the windows on disc 11 and numeral set 14 to facilitate use of the calculator. For economy, all parts of the calculator except spring 84 and washer 96 are desirably of molded plastic. However, it will be apparent that various parts can also be made of other materials, such as a metal.

From the above, it is readily apparent that the device of the present invention can be easily manipulated by the user with a minimum of steps. For example, assume as before that a woman's shortest cycle is twenty-eight days, her last cycle started on the tenth of the month, and her variance is four days. Then, a coin can be placed in slot 91 and turned to rotate disc 13 to display the number "4" in window 31. The number of fertile days can be read from window 32 as "9." The coin can next be used to push driver 83 upward to engage teeth 97 with teeth 69 on disc 12 and rotated to display the number "28" in window 20. Selector 23 can be rotated to place mark 25 adjacent the "10" in numeral set 14; and the date of the start of the fertile days appears in window 24 as the twentieth.

Modifications of the invention will be apparent to those skilled in the art. For example, it is apparent from Equation 1 that the numeral set 17 for designating the start of the fertile days, and numeral set 14 for designating the start of the last period can be on the same disc, and this disc rotated with respect to a fixed disc having numeral set 16 in order to provide the start of the fertile days.

I claims:

1. A discoidal device for calculating the length and starting date of the fertile days of a woman comprising at least three concentric discs, a first of which is fixed; second and third of said discs being selectively rotatable with respect to said first disc; said first disc being annular and overlying said second and third discs and having a first set of numerals for designating the date of the start of the woman's last menstrual cycle about the inner periphery of a face thereof; said second disc having a second arcuate set of numerals covered by said first disc for designating the length in days of the shortest menstraul cycle of said woman in a previous preselected period of time; said first disc having a window overlying said second set of numerals to display selectively numerals from said second set; and a third set of numerals on said second disc inwardly of said first disc for designating the days of the months having 30 and 31 days; said third set of numerals being in a predetermined relationship to said second set of numerals so that when a numeral from said second set is displayed in said window on said first disc the numerals of said third set are radially aligned with the numerals of said first set to provide the starting dates of the fertile days of the woman corresponding to such numeral in said window and the respective numerals of said first set; a fourth set of arcuate numerals on said third disc for designating the variance in days of the woman's longest and shortest menstrual cycles during a preselected period of time; and a fifth set of arcuate numerals on said third disc, each numeral of which has a predetermined relationship to a numeral in said fourth set and has a value in days five greater than such numeral of said fourth set; said first disc having a pair of windows, the first window overlies said fourth set of numerals to display selectively numerals from said fourth set, and the second window overlies said fifth set of numerals in such above-mentioned predetermined relationship, whereby when any one of the numerals from said fourth set of numerals is displayed in the first of said pair of windows said numeral from said fifth set of a value five greater than such numeral from said fourth set is displayed in said second window.

2. The device of claim 1 wherein a means is provided enabling selective rotation of either of said second and third discs with respect to said first disc to display a selected numeral from each of said second and fourth sets of numerals in their respective overlying windows.

3. A discoidal calculating device comprising a hollow body of saucer shaped members fixedly secured together at their periphery, one of said members being annular to form a central aperture and having a first set of indicia on an exterior face thereof about the inner periphery thereof; a pair of selectively rotatable discs within said body concentric with the annular saucer shaped member and mounted for individual rotation with respect thereto; a first of said pair of discs being contiguous with said annular member and having a second arcuate set of indicia on a face thereof covered by said member, and a third set of indicia on a face thereof disposed inwardly of the inner periphery of said annular member; said annular member having a window overlying said second set of indicia for displaying selected indicia therefrom; a plate member rotatable with respect to said annular member disposed within said central aperture over said third set of indicia, said plate having a window for displaying selected indicia from said third set and an indicator mark for designating indicia from said first set; said first disc having arcuate slots therein, the second of said pair of discs being contiguous with said first disc and having at least fourth and fifth arcuate sets of indicia visible through said slots; said annular member having at least one window overlying each of said fourth and fifth sets of indicia for displaying selected indicia therefrom; and means enabling selective rotation of said discs with respect to said annular member.

4. The calculating device of claim 3 wherein each of said discs has a central aperture with teeth about its periphery; and said means for enabling selective rotation of said discs comprises a movable clutch member having teeth for selectively engaging between the teeth about the central apertures of each of said discs.

5. The calculating device of claim 3 wherein said first set of indicia are for designating the date of the start of a woman's last menstrual cycle, said second set of indicia is for designating the length in days of the shortest menstrual cycle of said woman in a previous preselected period of time, said third set of indicia is for designating the starting date of the fertile days of said woman; one of said fourth and fifth sets of indicia is for designating the variance in days of the woman's longest and shortest menstrual cycles during a preselected period of time and the other of said fourth and fifth sets of numerals is for designating the number of fertile days of said woman.

References Cited by the Examiner

UNITED STATES PATENTS

| 2,719,006 | 9/55 | Clemens | 235—78 |
| 2,725,195 | 11/55 | Rueff | 235—85 |
| 2,779,541 | 1/57 | Rich | 235—78 |
| 2,904,249 | 9/59 | Rich | 235—78 X |
| 2,924,144 | 2/60 | Bakke et al. | 235—64.7 X |
| 3,016,190 | 1/62 | Baumann | 235—84 |

LEO SMILOW, *Primary Examiner.*